United States Patent [19]

Collins, III et al.

[11] 4,054,474
[45] Oct. 18, 1977

[54] SHRINK WRAPPING

[75] Inventors: John W. Collins, III, Allegheny Towhship, Westmoreland County; E. Scott Douds, Pittsburgh, both of Pa.

[73] Assignee: Aluminum Company of America, Pittsburgh, Pa.

[21] Appl. No.: 668,206

[22] Filed: Mar. 18, 1976

[51] Int. Cl.$^2$ .............................................. B29C 27/00
[52] U.S. Cl. .................................... 156/86; 53/30 S; 53/184 S; 156/267; 156/282; 156/497; 156/498; 156/510; 264/230; 264/342 R; 264/DIG. 71
[58] Field of Search ............. 53/30 S, 184 S; 156/86, 156/282, 267, 498, 510, 497, 511; 264/DIG. 71; 264/230, 36, 2 R

[56] References Cited

U.S. PATENT DOCUMENTS

| 2,253,069 | 8/1941 | Eckel et al. | 156/390 |
| 2,452,607 | 11/1948 | Slaughter | 156/86 |
| 3,075,868 | 1/1963 | Long | 156/282 |
| 3,223,568 | 12/1965 | Alderfer | 156/282 |
| 3,223,571 | 12/1965 | Straughan | 156/86 |
| 3,360,899 | 1/1968 | Kracht et al. | 53/30 S |
| 3,523,052 | 8/1970 | Bolen | 156/521 |
| 3,782,070 | 1/1974 | Erlandson | 53/184 S |
| 3,813,272 | 5/1974 | Straughan | 156/86 |
| 3,832,260 | 8/1974 | Staughan et al. | 156/86 |

*Primary Examiner*—Edward G. Whitby
*Attorney, Agent, or Firm*—David W. Brownlee

[57] ABSTRACT

A system is disclosed for applying plastic labels on cylindrical can bodies which includes moving the cans end-to-end in a continuous series through a forming horn over which a strip of heat-shrinkable sheet plastic is drawn to form the plastic strip into an envelope around the cans with the opposite edges of the strip adjacently disposed longitudinally of the cans, welding the opposite edges of the plastic strip to form a tube around the series of cans, heating the plastic tube to shrink it against the cans, severing the plastic tube between cans to separate them into individually wrapped cans, and further shrinking at least the ends of the plastic tube into snug engagement against the ends of the side wall of each can.

10 Claims, 14 Drawing Figures

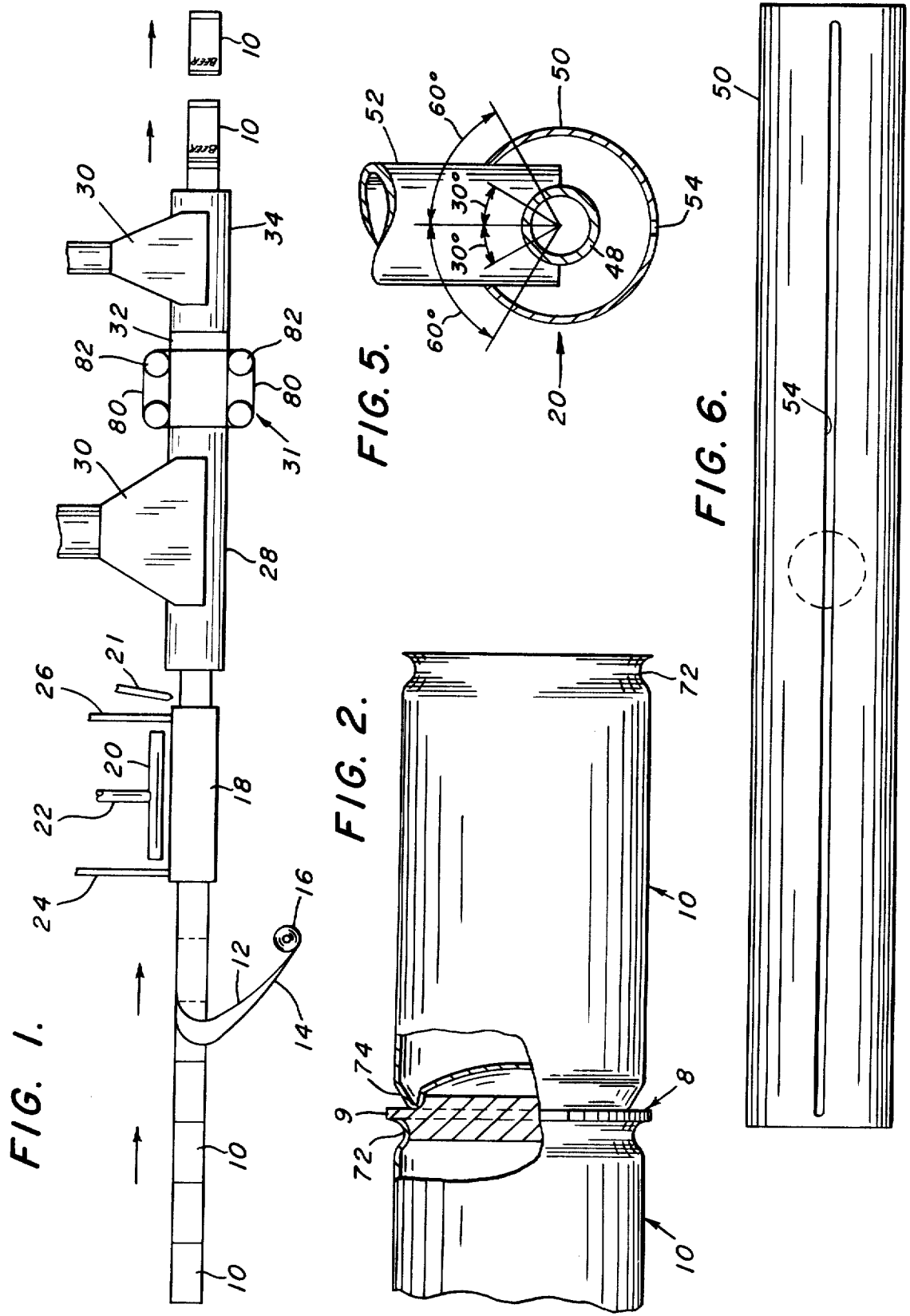

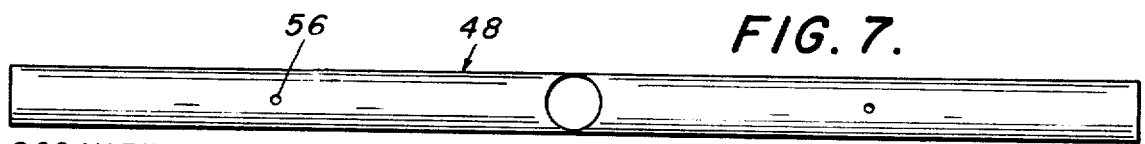
FIG. 7.
90° VIEW
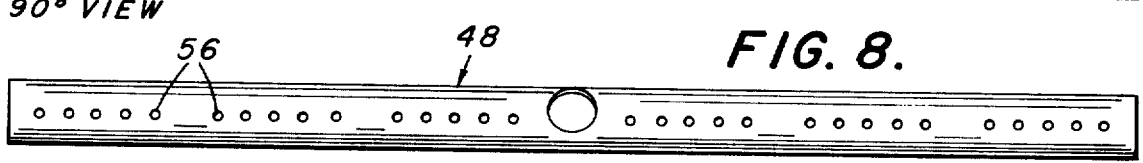
FIG. 8.
30° VIEW – BOTH SIDES
FIG. 9.
70° VIEW – BOTH SIDES
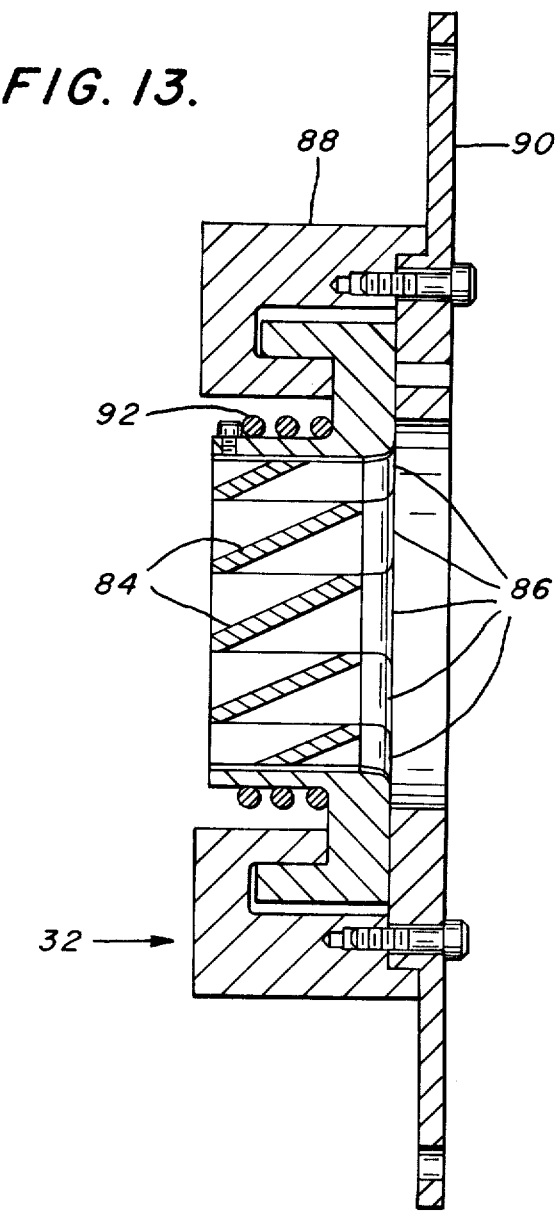
FIG. 13.

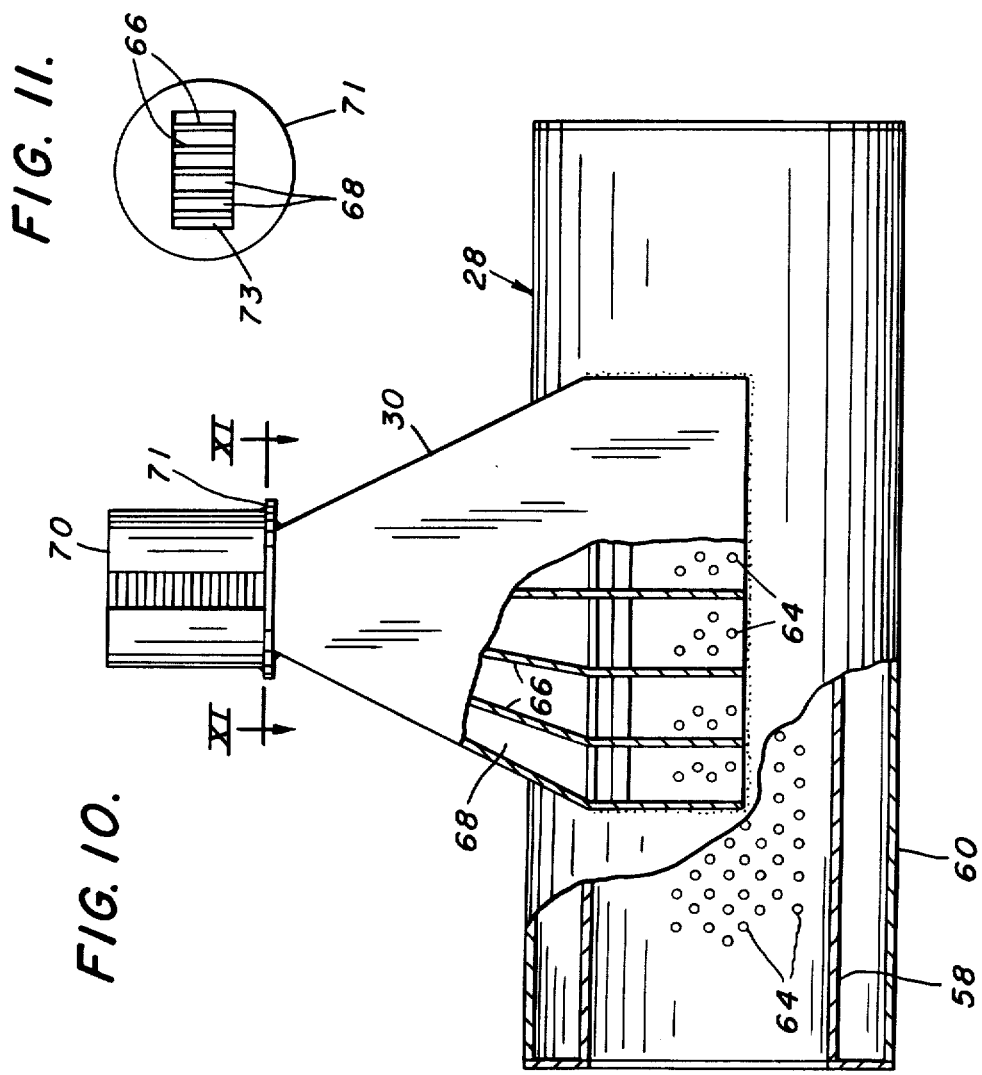
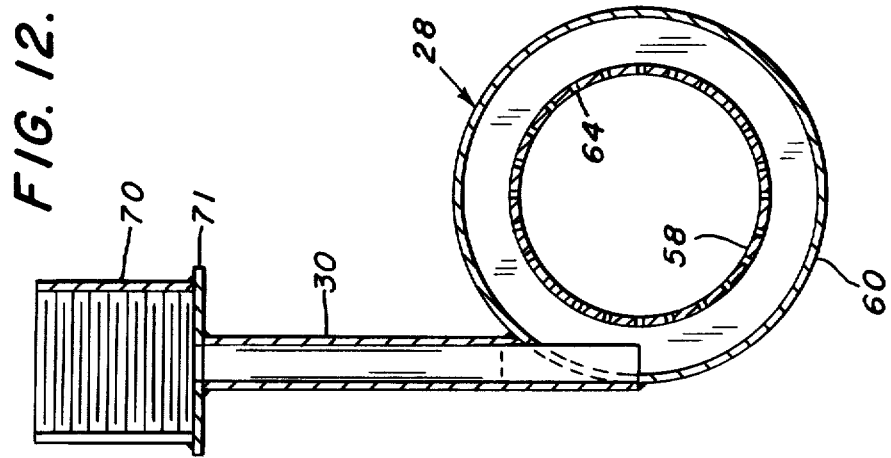

SHRINK WRAPPING

BACKGROUND OF THE INVENTION

1. Field of Art

This invention relates to decoration of cylindrical articles and in particular to shrink wrapping plastic film against cylindrical articles such as can bodies.

2. Brief Description of the Prior Art

In the decoration of can bodies, the most commonly used techniques are off-set printing with ink as is typical for beer and beverage cans, and paper labeling as is typical for food cans. Although off-set printing is widely used, an alternative technique is desired which would use less heat energy and produce less air pollution. Typical off-set printing systems require a base coat and two baking operations to dry the base coat and the ink and the printed cans. Printing uses considerable heat energy in such baking operations, can cause objectionable air pollution when hydrocarbon solvents are driven off during drying, and is time consuming. Off-set printing equipment is also expensive and the off-set printing is one of the primary causes of scrap cans in can manufacturing lines. Paper labels are acceptable for food cans, but are vulnerable to damage or loss, and are not suitable for beer and beverage cans which are exposed to water.

Plastic labels are known, but there has heretofore been no fast way of applying such labels on cans at the speeds typical of most can making lines. The prior art such as U.S. Pat. Nos. 3,110,554 and 2,878,628 discloses techniques in which articles are shrink wrapped with plastic labels one article at a time.

The prior art is lacking in a disclosure of a high speed technique for applying plastic labels on articles such as can bodies.

SUMMARY OF THE INVENTION

This invention provides a system for applying plastic labels on cylindrical bodies by moving the bodies end-to-end in a continuous series, wrapping a strip of heat-shrinkable sheet plastic around the series of bodies with the opposite edges of the strip adjacently disposed longitudinally of the bodies, welding together the opposite edges of the plastic strip to form a tube around the bodies, heating the plastic tube to shrink it against the cylindrical bodies and severing the plastic tube between adjacent cylindrical bodies to separate them into individually wrapped bodies. After the plastic tube has been severed between the cylindrical bodies, the tube may again be heated to shrink its ends against the ends of each body. In a preferred embodiment of the invention, the plastic labels are heat shrunk on can bodies using hot air in a tunnel through which cans and film are moved.

Accordingly, an object of this invention is to provide an improved method and apparatus for decorating cylindrical bodies.

Another object of this invention is to provide a method and apparatus for wrapping a plastic film around cylindrical articles in which the articles moving end-to-end through a forming horn act as a mandrel for forming the plastic film into a tube which is shrunk against the bodies and thereafter severed between adjacent bodies.

A further object of this invention is to provide an improved method and apparatus for continuously welding the opposite edges of a strip of plastic which is formed into a tube around cylindrical bodies.

Another object of this invention is to provide improved means for heat shrinking a plastic tube against cylindrical articles in the tube.

This invention facilitates decoration of can bodies with plastic labels at speeds of 300 or more cans per minute which is typical of most can forming lines. The cans are rapidly moved end-to-end through a forming horn which wraps a strip of sheet plastic over the cans which act as the central mandrel for forming the plastic tube therearound. The edges of the plastic tube are welded together and the tube is shrunk against the cans and severed between cans to provide individually wrapped can bodies. This invention eliminates the need for a base coat on the exterior surface of the cans and eliminates any need to bake such base coat or to bake the decoration on the cans as is required with printed cans. This invention also produces essentially no air or water pollution because it uses no liquid coating containing solvents which cause such pollution. The system also permits quick and easy changes in the decoration of the cans by merely changing the plastic film.

The above and other objects and advantages of this invention will be more fully appreciated and understood with reference to the following description and the drawings attached hereto.

BRIEF DESCRIPTION OF THE DRAWINGS

FIG. 1 is a side view of a system for decorating cans in accordance with this invention.

FIG. 2 is a side view in partial section showing two adjacent can bodies and a spacer member therebetween.

FIG. 5 is a cross section through the seam welding manifold of FIG. 1.

FIG. 6 is a bottom view of the manifold of FIG. 5.

FIG. 7 is a top view of the inner tube in the manifold of FIG. 5.

FIG. 8 shows the inner tube of FIG. 7 as viewed at a 30° angle on either side of the top of the tube (Reference FIG. 5).

FIG. 9 shows the inner tube of FIG. 7 as viewed at a 60° angle on either side of the top of the tube (Reference FIG. 5).

FIG. 10 is a side view of the shrink tunnel of FIG. 1 partially cut away.

FIG. 11 is a sectional view taken along line 11—11 of FIG. 10,

FIG. 12 is a transverse cross-sectional view through the shrink tunnel of FIG. 10.

FIG. 13 is a cross section through apparatus for severing the plastic tube between adjacent can bodies.

DESCRIPTION OF A PREFERRED EMBODIMENT

Figure 3:
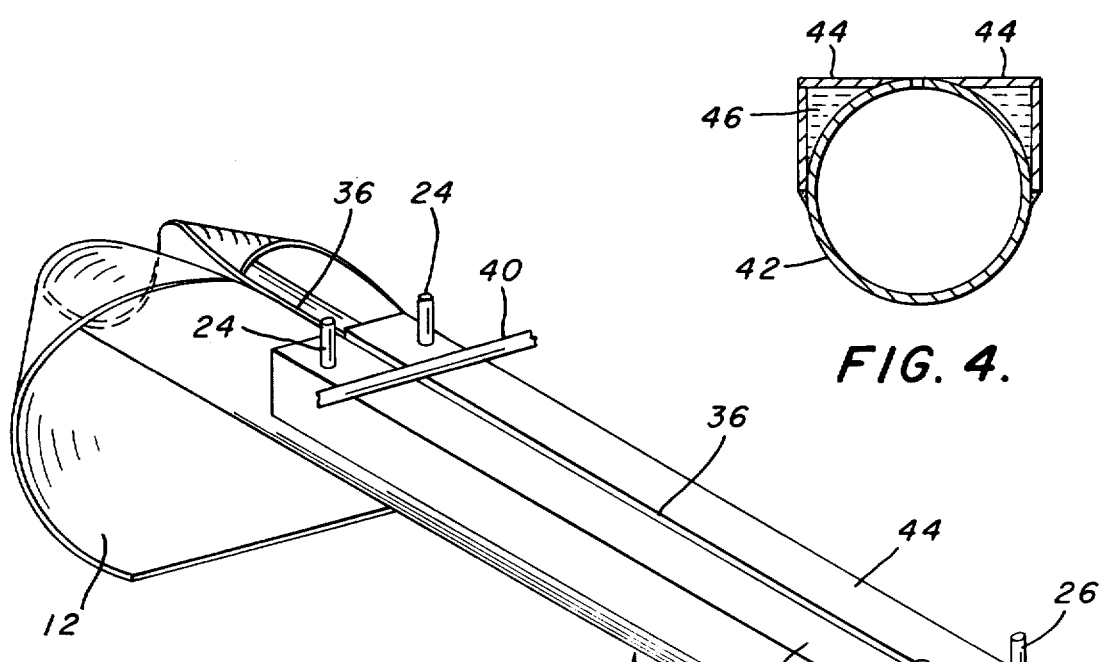
FIG. 3 is a perspective view showing the forming horn, trimming blade and seamer from FIG. 1.
Figure 4:
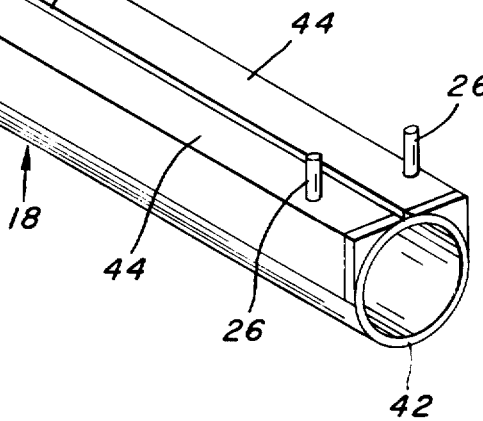
FIG. 4 is a cross-sectional view through the seamer of FIG. 3.

FIG. 1 illustrates a preferred embodiment of the invention for shrink wrapping plastic film labels on can bodies 10 such as drawn and ironed can bodies having integral bottom ends and open top ends as shown in FIG. 2. The undecorated cans 10 are moved end-to-end by means, not shown, in a continuous series along a path formed by guide rails or the like, not shown, into the shrink wrap apparatus.

In a preferred embodiment, disc-shaped metal spacer members 8 are provided between the adjacent cans as shown in FIG. 2 and accompany the cans through the line to help maintain alignment of the cans and to cooperate with a cut-off tunnel to sever the plastic tube which is wrapped around the cans as will be explained. The spacer members 8 may be solid disc shaped to fit the opposite ends of the cans as shown in FIG. 2 or may be formed from plate metal with ears or tangs cut out of the plate metal and projecting from both sides thereof to seat in the ends of the cans.

The spacer members 8 help control registration of any printing and/or decoration on the plastic film with respect to the can bodies. In the absence of spacer members, seating the ends of the cans against one another could sometimes result in accumulated variations in a series of cans of up to one-eighth inch or more in the relative positions of the cans. This is because the dimensions and angles of the contacting surfaces on the opposite ends of the cans are not accurately controlled during manufacture. Relatively large variations in the positions of the cans would make it very difficult, if not impossible, to register the decoration on the film with respect to the cans. The spacer members minimize variations in the relative positions of the cans because such spacers are seated against the extreme end portions of the can which are dimensionally controlled during manufacture of the cans. Accurately controlling the relative positions of the cans naturally makes registration of the plastic film with the cans much easier.

In a preferred embodiment of this invention, the shrink wrap apparatus includes a forming horn 12, a roll 16 from which plastic film 14 is dispensed, a seamer 18, a hot air manifold 20, a vortex tube 21 for providing a source of cold air, shrink wrap tunnels 28 and 34, a line speed stabilizer 31, a cut off device 32, controls, and other peripheral apparatus, not shown, for feeding the cans through the apparatus.

In operation of the apparatus, cans 10 are first guided through the forming horn 12 which wraps a strip of heat shrinkable sheet plastic 14 around the cans with the opposite edges of the strip adjacently disposed longitudinally of the cylindrical cans. From the forming horn 12, the cans 10 with the plastic strip wrapped therearound move into a seamer 18 which trims the edges of the strip and welds them together to form a tube of plastic containing the can bodies. The weld is produced by melting the edges of the plastic with hot air from a manifold 20 and cooling the melted plastic with cold air from the vortex tube 21 to form a weld bead. The seaming manifold 20 is connected to a source of hot air (not shown) through a hot air line 22, and preferably has coolant lines 24 and 26 connected thereto to cool the plastic strip adjacent the weld as will be described later. The vortex tube 21 is connected to a source of compressed air which is cooled by expansion in the tube. It will be apparent that other sources of cold air may be used in place of the vortex tube.

From the seamer 18, the cans in the plastic tube move through a shrink tunnel 28 which shrinks the plastic tube against the can bodies. The heat for such shrinking operation is preferably provided by means of hot air from the manifold 30, but may also be provided by other means such as by induced electrical currents which heat the cans which in turn heat the plastic tube to shrink it against the cans.

From the shrink tunnel 28, the cans move through the line speed stabilizer 31 which controls the speed and alignment of the cans. From the line speed stabilizer the cans move through a film cut off mechanism 32 which severs the plastic tube between the metal cans 10 to separate them. After the tube has been severed between cans, at least the end portions of the tube may be again heated as in a heat tunnel 34 to shrink the plastic into engagement against the opposite ends of the side wall of each can. A shrink wrap line such as that illustrated in FIG. 1 may be oriented either horizontally as shown in that figure or may also be oriented vertically with the cans 10 moving either upwardly or downwardly through the apparatus.

In the practice of this invention, it is preferred that the can bodies be preheated before coming into the system to thereby permit faster shrink wrapping of the plastic film on the cans. If the cans are not preheated, a longer dwell time is required in the system to shrink the film because the conductivity of the cans will drain heat from the film and delay or slow heating of the film to the required temperature for the desired shrinkage of the film. Preferably the cans will have a temperature of approximately 180°-190° F as they enter the system. In some can lines, preheating may be provided by the cleaning apparatus which precedes the shrink wrap line. The cleaning equipment usually includes apparatus such as an oven for drying the cans after washing which will preheat the cans as is desired for entering the shrink wrap apparatus.

The plastic film which is used in the system of FIG. 1 may be of a variety of material. However, an oriented polypropylene film has been found to work well for shrink wrapping metal can bodies. The polypropylene is preferably oriented so shrinkage will primarily occur across the width of the strip rather than longitudinally of the strip. Consequently, when the strip is wrapped around a can body with the edges extending longitudinally of the body, heat shrinking the tube formed by the film will reduce the diameter of the tube into snug engagement with the outer surface of each can body without significantly reducing the length of the tube on the can body.

For decorating cans, the plastic film has printing and/or other decoration thereon. Such decoration is preferably on the face of the film which will be against the cans when wrapped with the film.

The system of this invention makes it possible to produce snug engagement of the plastic tube against each can body with a minimum of shrinkage required of the film. This is because the film is wrapped around the can bodies rather than requiring the can bodies be inserted into a preformed tube as with prior art systems. When the plastic film is wrapped around the can bodies and the seam subsequently welded, it is possible to form the tube with a smaller diameter relative to the can body than is possible when the can bodies must be inserted into a previously formed tube. It has been found that in the practice of this invention, it is possible to form a plastic tube around the can bodies which requires only approximately five percent shrinkage to provide a tight fit of the tube against each can body. Minimizing the amount of reduction or shrinkage required of the plastic tube also minimizes the temperature to which the tube must be heated to shrink it against the can bodies. This in turn conserves energy, facilitates rapid shrinking the plastic tube against the can bodies, and minimizes distortion of the film and any decoration on it which would damage the aesthetics and legibility of such decoration.

Minimizing the shrinkage required to produce snug engagement of the plastic tube against the can bodies also makes it possible to avoid total stress relief of the film. Total stress relief is undesirable because it precludes further shrinkage of the film as may be desirable to produce a tight fit of the film against the necked-in area around the top of each can and the frusto-conical area on the bottom of the can.

FIG. 3 shows the forming horn 12 and seamer 18 in more detail than is shown in FIG. 1. The forming horn 12 is similar to the horns which are commonly used in forming plastic or cellophane bags for food such as potato chips and the like. It is preferably made of a polished steel which is shaped to guide the strip of plastic 14 into a tubular shape around the cans 10.

Figure 3B:
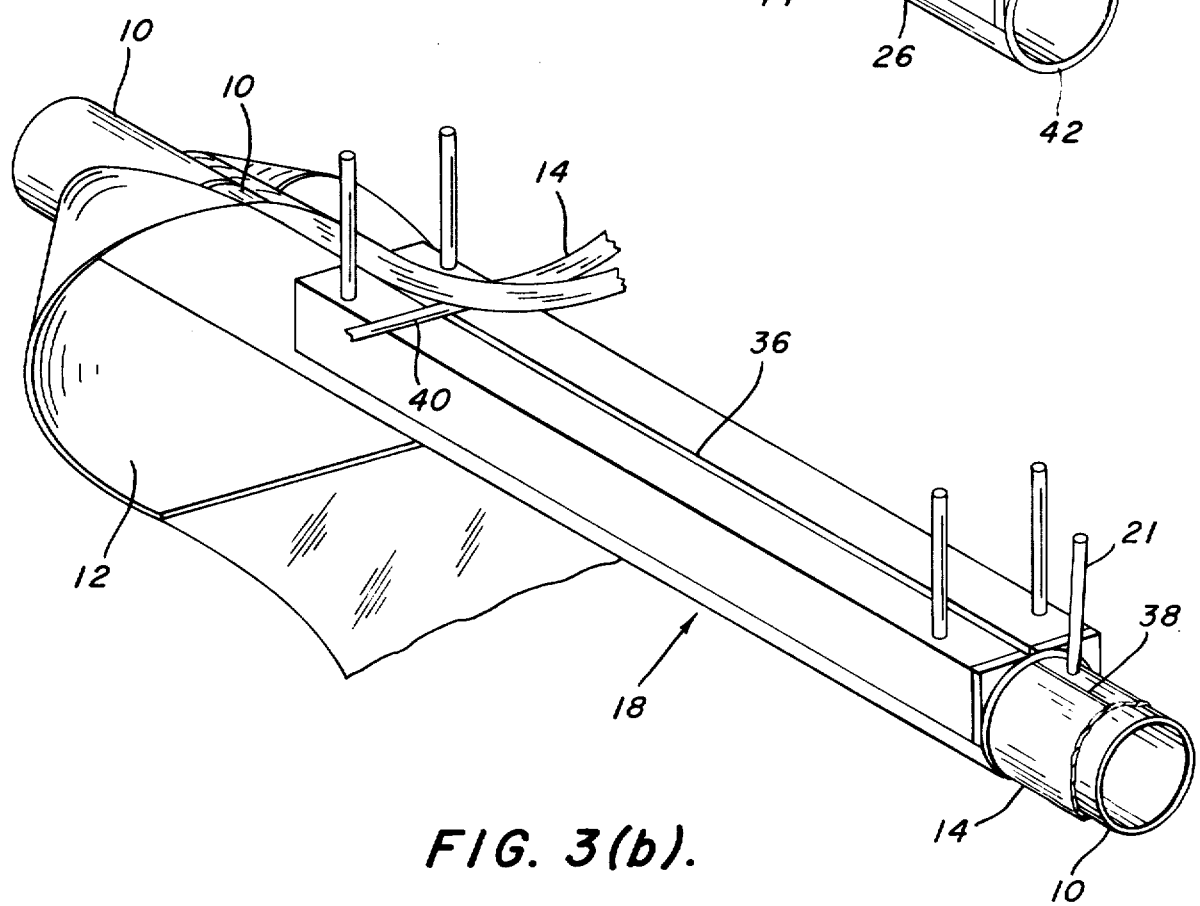
FIG. 3(b) is a perspective view similar to FIG. 3 and further showing the plastic film being formed into a tube around the cans.

The seamer 18 comprises a hollow metal conduit 42 with a longitudinally extending slot 36 along its length and cooling chambers 44 on opposite sides of the slot. Each cooling chamber 44 has coolant such as water 46 flowing therethrough from coolant lines 24 and 26 to cool the plastic tube adjacent the slot 38 during welding of the longitudinal edges of the film. The horn 12 is welded or otherwise attached on the end of the conduit 42 to guide the plastic film 14 around the cans 10 as they move through the horn and conduit as illustrated in FIG. 3(b). As seen in that figure, the cans 10 act as a mandrel as they move through the center of the horn.

The forming horn 12 brings the opposite edges of the film 14 into juxtaposition extending longitudinally of the cans 10 and guides such edges into and along the slot 36 in the seamer 18. The edges of the plastic strip 14 project radially outwardly from the cans through the slot 36 with the inside surfaces of the film on the opposite edges of the strip in face-to-face relation. As the edges of the film 14 are guided along the slot 36 in the seamer, a cutting edge or blade 40 disposed across the slot trims excess material from such edges of the strip as is illustrated in FIG. 3(b). The cutting blade 40 is preferably adapted to be periodically advanced across the slot in the seamer 18 to provide a new cutting edge for trimming the edges of the film 14 to insure that a sharp edge is always presented for such purpose.

After the edges of the film have been trimmed, they are melted by hot air which is directed against such edges from the manifold 20 disposed over the seamer as is illustrated in FIG. 1. The manifold 20 is further shown in FIGS. 5-9 as comprising an inner tube 48 and an outer tube 50 with a source of hot air supplied to the inner tube through a duct 52. In order to form a strong uniform weld bead, the manifold 20 should provide a uniform flow of hot air against the adjacent edges of the plastic film along substantially the entire length of the manifold. To provide such a uniform flow of hot air, hot air is fed from the duct 52 into the inner tube 48 which distributes the hot air into the outer tube 50 for escape through a slot 54 (FIGS. 5 and 6) disposed immediately above the edges of the plastic film which are to be welded. The inner tube 48 as seen in FIGS. 7-9 preferably has a plurality of holes 56 therein located so as to uniformly distribute the hot air into the outer tube 50. In a preferred embodiment, tube 48 has two holes 56 in the top thereof as seen in FIG. 7, 30 holes 56 in both sides at 30° from the top as seen in FIG. 8, and 14 holes 56 in both sides at 70° from the top as seen in FIG. 9. Thus, the holes 56 in the inner tube are located on the side thereof opposite the slot in the outer tube, and are more numerous toward the ends of the tube. Such location of the holes 56 reduces the resistance to air flow into the ends of the manifold 20 and causes approximately equal quantities of air to be exhausted from the slot 54 in the outer tube 50 along its entire length. But for the distribution of the small holes 56 in the inner tube, an excess of hot air would exit the slot 54 in the outer tube near the middle of the manifold. In the embodiment selected for illustration the inner tube 48 has two holes 56 in its top as shown in FIG. 7, 30 holes on each side at 30° from the top as shown in FIG. 8, and 14 holes on each side as shown in FIG. 9. It will be apparent to those skilled in the art that the exact number and location of holes is a function of the inlet and exit orifice areas and the required exit orifice jet velocity, and is not limited to the embodiment selected for illustration. However, the general layout of the holes is important to proper distribution of air in the manifold.

The desired flow rate and temperature of the air from the manifold depends on a number of factors such as the speed at which the cans 10 and plastic tube 14 are moved through the seamer 18 and the particular composition and thickness of the plastic film. For example, in seaming a plastic film made of polypropylene of 70 or 90 gauge using a manifold 20 with a 12 inch long hot air orifice, 0.0937 inch wide, positioned 0.125 inch above the finished weld, the air flow in the manifold should be approximately 8 cubic feet per minute at a temperature in the range of 450° F to 800° F. Polypropylene such as that available from Hercules Company under the trademark Hercules BC 120 shrink film has a melting point of approximately 233° F. By varying the rate of air flow and air temperature through the manifold, the adjacent edges of the plastic strip can be melted to form a narrow bead of liquid plastic along the length of the strip.

After the edges of the plastic have been melted together, the bead of plastic is cooled to form a weld seam 38. To produce a strong weld seam 38, it is desirable to rapidly cool the liquid plastic to produce amorphous, rather than crystalline, polypropylene in the seam. Rapidly cooling the liquid polypropylene prevents the growth of crystals in the polypropylene which would produce a brittle crystalline structure in the weld.

In an exemplary embodiment of the invention, the bead of liquid polypropylene is cooled by means of a jet of approximately −50° F air which is directed at the melted bead from the vortex tube 21. Vortex tubes are well known in the art and do not require description for an understanding of this invention. It will be apparent that the quantity and temperature of the cold air required to rapidly cool the liquid plastic into an amorphous weld seam will depend on a number of factors such as the composition, thickness and speed of the plastic film as it moves past the jet of cold air.

After the edges of the plastic film 14 have been welded to form a plastic tube around the series of cans 10, the cans and tube move into and through the shrink tunnel 28 shown in detail in FIGS. 10-12. The shrink tunnel 28 includes an inner conduit 58 open at both ends for the cans and film to move therethrough and an outer conduit 60 connected to a manifold 30 for feeding hot air into the outer conduit and through numerous small holes 64 in the inner conduit to heat the plastic film on the cans moving through the tunnel. The manifold 30 causes the hot air to flow around the entire periphery of the inner conduit 58 and distribute the air uniformly along the length of such conduit. The inner conduit 58 may have 850 or more holes 64 in it for the hot air to pass through into the center of the conduit.

To provide uniform distribution of the hot air into the shrink tunnel, the inlet manifold 30 preferably includes equally spaced baffle plates 66 therein which divide the manifold into a plurality of channels 68 for carrying the hot air from the inlet coupling 70 into the space between the inner and outer conduit. FIG. 11 shows the inlet ring 71 from the inlet coupling 70 into the manifold 30 with baffle plates 66 therein. The inlet ring 71 has a rectangular hole 73 in it through which the hot air flows into the manifold. By providing a plurality of separate paths for air to flow into the space between the inner and outer conduits, the air is more uniformly distributed along the length of the shrink tunnel. The manifold 30 is also preferably disposed generally tangentially of the tunnel 28 to force the air to flow around the periphery of the inner conduit 58 and uniformly distribute it to all of the many holes 64 in such conduit.

In a preferred embodiment of this invention, the shrink tunnel has a low back pressure in it to minimize the resistance of air flow into the tunnel. The low back pressure is achieved by providing a large exit area for the heated air to flow through into the center of the inner conduit. For example, in an exemplary embodiment of the invention the holes 64 in the inner conduit 58 have a total cross sectional area which is approximately four times the cross sectional area of the inlet hole 73 into the manifold to minimize the back pressure in the tunnel.

The design of the shrink tunnel 28 with the inner and outer conduit 58 and 60, the manifold 30 and proper location of the many holes 64 in the inner conduit also produces generally uniform air temperature and velocity in the tunnel to uniformly shrink the plastic film with little or no distortion. The manifold 30 distributes the hot air around the inner conduit 58 and the concentration of holes 64 in the center area of the inner conduit avoids dead air spaces and turbulent air flow which could distort the plastic film.

The required volume rate of flow and temperature of the air in the shrink tunnel depends on a number of factors such as the nature of the plastic film which is to be shrunk, and the rate of travel of the plastic film and cans through the tunnel. For example, in shrink wrapping 100 aluminum cans per minute with a polypropylene film having either a 70 or 90 gauge thickness, air at 300° F to 360° F and an air flow rate of approximately 22 cubic feet per minute at inlet hole 73 may be employed with a 12 inch long shrink tunnel having 850 small holes in the inner conduit 58 through which jets of air will exit at approximately 3500 feet per minute. To increase the number of cans per minute, the length of the shrink tunnel may be increased. Tripling the length of the shrink tunnel to 36 inches will permit shrinking the film on cans at speeds of 300 or more cans per minute.

From the shrink tunnel 28, the cans 10 with the film 14 shrunk thereon move through a line speed stabilizer 31 (FIG. 1) which controls the speed of the cans through the line and prevents twisting of the cans and the film on the cans. The line speed stabilizer 31 may comprise a plurality of parallel belts 80 which are driven by wheels or pulleys 82. The belts extend longitudinally of the cans with the surface of each belt toward the cans having a contour generally corresponding with the outer surface of the cans for engagement of almost the entire periphery of the cans by the several belts located around the line of cans. The belts 80 are pressed lightly against the surface of the film 14 on the cans so the moving belts will move or drive the cans through the line. The line speed stabilizer 31 assures proper alignment of the cans in the seaming manifold and also produces a slight tension in the film on the cans to prevent sags, wrinkles or the like in the film when it is shrunk against the cans.

From the line speed stabilizer 31, the cans 10 with the plastic tube shrunk thereagainst move through a film cut-off device 32 which severs the plastic tube 14 transversely between can bodies. In a preferred embodiment of this invention the cut-off device 32 comprises a short tube or tunnel having a plurality of inwardly projecting ribs 84 on its inside surface for engagement against the outer edge 9 of the metal spacers 8 between the cans 10 (FIG. 2) for severing the plastic film therebetween. To facilitate fabrication of such cut-off device 32, it may comprise a plurality of segments 86, each of which has a rib 84 on it disposed at an angle to the axis of the tunnel so each rib will cut the film around a short arc length of the film. The segments 86 may be mounted on a ring 88 and plate 90 and have several compression springs 92 around them to press the ribs inwardly into contact with the edge 9 of each spacer member 8 as it moves through the cut-off device. The cut-off device preferably has a converging lead-in portion on the right hand side thereof as viewed in FIG. 13 so the can bodies should move through such device from right to left as viewed in that FIGURE. To insure that the plastic film is severed around its entire circumference, two such cut-off devices 32 may be provided back-to-back with the segments 86 and the ribs 84 thereon angularly offset between devices so the ribs on the second device overlap the ribs on the first device.

The film cut-off may alternatively be provided by impregnating a line of metal particles in the strip of plastic film transversely across the strip at intervals corresponding with the length of the cans in the tube and heating such particles by induction heating coils or radiant energy to melt the plastic film at the location of such line of magnetic particles and thereby sever the film at such locations.

After the plastic film has been severed between cans, at least the terminal ends of the film are preferably again heated to shrink them against the ends of the side wall of each can. Metal cans such as the drawn and ironed can 10 illustrated in FIG. 2 typically have a necked-in area 72 around the open top end and a frusto-conical zone 74 adjacent the bottom end. Post heating of the film 14 after cut-off shrinks the ends of the film into these areas of reduced can diameter to provide snug engagement of the plastic film against the can along the entire length of the film. Engagement of the film against the areas of reduced can diameter also helps to hold the film on the cans and prevent accidental removal thereof. In the system selected for purposes of illustration, a second skrink tunnel 34 similar to shrink tunnel 28 described above is employed to shrink the ends of the severed tube against the ends of the can bodies.

After the film 14 has been shrunk tightly against the end portions of the cans 10, the spacer members 8 are removed from between the cans and are routed back to the start of the line for reuse. The cans 10 are now ready to be inspected, filled with beer or beverage, and sealed with a top end wall.

It is seen that this invention provides a method and apparatus for high speed application of plastic labels on cylindrical bodies such as metal cans. The invention has particular use in applying shrink wrap labels on cans for beer and beverage. The lines for making such cans typically operate at speeds of approximately 300 cans per minute and require a system for decorating the cans at a similar speed. Shrink wrapping cylindrical bodies as with this invention facilitates rapid changing of the decoration on the articles by merely changing the film which is used. The same line and tools can therefore be used for decorating cans having many different decorations thereon. This invention also greatly reduces air pollution as may result from conventional lines for decorating cans by off-set printing which evolve hydrocarbon gases during drying of the base coat and ink on the cans.

Although a preferred method and apparatus has been selected for purposes of illustration and description, it will be apparent to those skilled in the art that numerous modifications can be made in such preferred apparatus and method without departing from the invention or the scope of the claims appended hereto.

What is claimed is:

1. Apparatus for decorating cylindrical bodies with a heat shrinkable plastic label comprising,
   means for spacing a continuous series of moving cylindrical bodies at regular intervals along a common central axis,
   means for forming a strip of heat shrinkable sheet plastic around the series of cylindrical bodies with the opposite edges of the strip adjacently disposed longitudinally of the cylindrical bodies,
   means for welding together the opposite edges of the plastic strip to form a tube around the series of cylindrical bodies,
   means for heating the plastic tube to shrink it against the cylindrical bodies, and
   means for severing the plastic tube between adjacent bodies.

2. A system for providing a plastic label around cylindrical bodies comprising,
   means for moving cylindrical bodies end-to-end in a continuous series,
   spacer means between the bodies as they move through the system,
   means for wrapping a strip of heat shrinkable sheet plastic around the continuous series of cylindrical bodies with the opposite edges of the strip adjacently disposed longitudinally of the cylindrical bodies,
   means for welding together the opposite edges of the plastic strip to form a tube around the series of cylindrical bodies,
   means for heating the plastic tube to shrink it tightly against the cylindrical bodies so the bodies will pull the plastic strip with them,
   means for severing the plastic tube between each pair of adjacent cylindrical bodies.

3. A system as set forth in claim 2 which includes means for shrinking the plastic tube against the ends of the side wall of each body after the tube has been severed between bodies.

4. A system as set forth in claim 2 in which the means for welding the edges of the plastic strip comprises a manifold which directs hot air at the edges of the strip to melt them and means for directing cold air at the melted plastic to solidify it into a welded seam.

5. A system as set forth in claim 4 which includes means for cooling the plastic strip adjacent the edges thereof during melting of the edges.

6. A system as set forth in claim 2 which includes means for trimming excess material from the edges of the plastic strip after it is wrapped around the bodies.

7. A system for shrink wrapping plastic labels on metal can bodies comprising,
   means for moving can bodies end-to-end in a continuous series,
   a forming horn for wrapping a strip of heat shrinkable sheet plastic around the can bodies with opposite edges of the strip adjacently disposed longitudinally of the cans,
   a seamer conduit for passage of the can bodies and plastic strip with the edges of the strip disposed in a longitudinally extending slot in the conduit,
   a blade for trimming excess material from the edges of the plastic strip around the cans,
   a manifold for directing hot air at the edges of the plastic strip as they move along the slot in the seamer conduit to melt such edges,
   means for directing cold air at the melted edges of the strip to solidify the plastic into a welded seam,
   a shrink tunnel for heating the plastic tube around the cans with hot air and thereby shrink the tube against the cans,
   means for cutting the plastic tube between cans, and
   means for heating at least the ends of the plastic tube on each can to further shrink it against the can.

8. A method of decorating cylindrical bodies comprising the steps of wrapping a strip of heat shrinkable sheet plastic around a moving series of cylindrical bodies positioned end-to-end with the opposite edges of the strip extending longitudinally of the bodies, welding the opposite edges of the plastic strip to form a tube around the series of articles, heating the plastic tube to shrink it against the bodies, controlling the relative positions of the moving bodies by means disposed between the bodies, and severing the plastic tube between adjacent bodies.

9. A method as set forth in claim 8 which includes heating at least the end portions of the tube on each body after the tube is severed to further shrink such end portions against each body.

10. A method as set forth in claim 8 which includes trimming the edges of the plastic strip before welding such edges together.

* * * * *